United States Patent
Harmke et al.

(10) Patent No.: US 10,069,322 B2
(45) Date of Patent: Sep. 4, 2018

(54) METHODS AND SYSTEMS OF MANAGING POWER IN A PORTABLE ELECTRONIC DEVICE

(71) Applicant: MOTOROLA SOLUTIONS, INC., Schaumburg, IL (US)

(72) Inventors: Charles B. Harmke, Elmhurst, IL (US); Daniel Grobe Sachs, Elmhurst, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 157 days.

(21) Appl. No.: 14/866,227

(22) Filed: Sep. 25, 2015

(65) Prior Publication Data

US 2017/0093176 A1 Mar. 30, 2017

(51) Int. Cl.
- *H02J 7/04* (2006.01)
- *H02J 7/16* (2006.01)
- *H02J 7/00* (2006.01)

(52) U.S. Cl.
CPC ............ *H02J 7/007* (2013.01); *H02J 7/0063* (2013.01); *H02J 2007/0067* (2013.01)

(58) Field of Classification Search
CPC .................................................. H02J 7/0078
USPC ....................................................... 320/162
See application file for complete search history.

(56) References Cited

U.S. PATENT DOCUMENTS

| | | | |
|---|---|---|---|
| 7,017,061 B2 * | 3/2006 | Lippert | G06F 1/3203 713/320 |
| 7,424,312 B2 | 9/2008 | Pinder et al. | |
| RE43,461 E | 6/2012 | Hand et al. | |
| 8,581,554 B2 * | 11/2013 | Saligram | H02J 7/0078 320/132 |
| 2008/0178032 A1 * | 7/2008 | Walrath | G06F 1/3287 713/340 |
| 2010/0205472 A1 * | 8/2010 | Tupman | G06F 1/3203 713/340 |
| 2014/0003616 A1 | 1/2014 | Johnson et al. | |
| 2014/0195826 A1 * | 7/2014 | Wojcik | H05K 5/0086 713/300 |

FOREIGN PATENT DOCUMENTS

| | | |
|---|---|---|
| EP | 2658231 | 10/2013 |
| GB | 2449149 | 11/2008 |

OTHER PUBLICATIONS

GB1614714.2 Combined Examination and Search Report dated Dec. 21, 2016 (3 pages).
GB1614714.2 Examination Report dated Nov. 8, 2017 (2 pages).

* cited by examiner

*Primary Examiner* — Yalkew Fantu
(74) *Attorney, Agent, or Firm* — Michael Best & Friedrich LLP

(57) ABSTRACT

A portable electronic device including a battery coupled to an accessory circuit, a battery monitoring circuit coupled to the battery, and a processor connected to the battery monitoring circuit and the accessory circuit. The battery monitoring circuit determines an output current of the battery, and the processor receives an indication of the output current. The processor determines, based on the indication of the output current of the battery, a power characteristic of the accessory circuit, and control a power that is to be provided to the accessory circuit based on the power characteristic of the accessory circuit.

18 Claims, 4 Drawing Sheets

METHODS AND SYSTEMS OF MANAGING POWER IN A PORTABLE ELECTRONIC DEVICE

BACKGROUND OF THE INVENTION

Portable electronic devices use numerous hardware and software components to provide specific functions. Portable electronic devices are often powered by a single power source (e.g., a battery). A battery may discharge quickly when multiple functions are utilized. It is often difficult to determine which functions to deactivate to reduce battery drain without adversely affecting the sound experience. In particular, when battery charge is low and preserving battery charge is desired, it can be difficult to discern which functions should be deactivated because portable electronic devices do not have a reliable way of determining the power consumption of each software and hardware component. Typically, if an accurate measure of the power consumed by a specific component is desired, a dedicated power sensor is coupled directly to the particular component of interest. Thus, measuring the individual power consumed by numerous components typically requires the use of one power sensor for each one of the components. Using multiple powers sensors can be costly and complex.

Accordingly, there is a need for methods and systems of managing power in a portable electronic device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
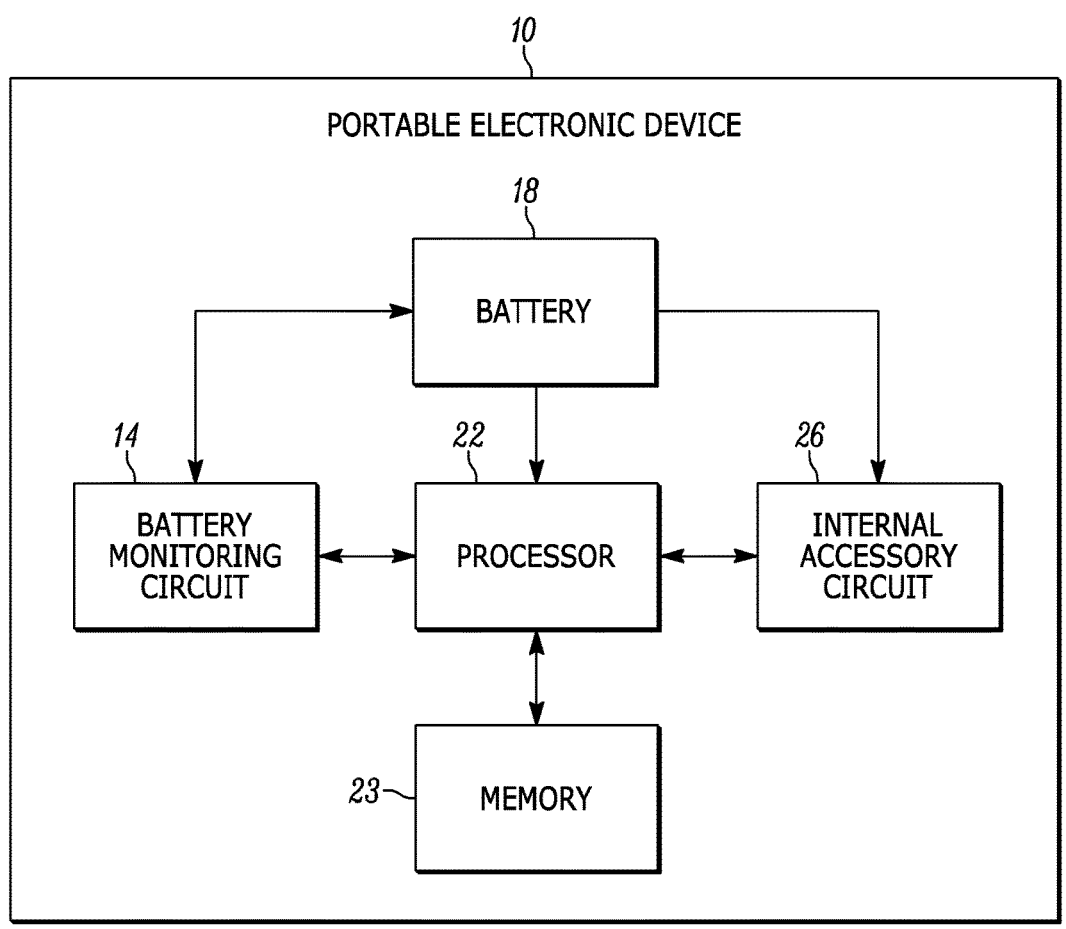
FIG. 1 is a simplified block diagram of a portable electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a portable electronic device that includes a battery coupled to an accessory circuit. A battery monitoring circuit is coupled to the battery and configured to determine an output current of the battery. A processor is coupled to the battery monitoring circuit and the accessory circuit. The processor is configured to receive an indication of the output current from the battery monitoring circuit, determine, based on the indication of the output current of the battery, a power characteristic of the accessory circuit, and control a power provided to the accessory circuit based on the power characteristic of the accessory circuit.

Another embodiment provides a method of managing power in portable electronic device that includes a battery coupled to an accessory circuit and a processor. The method includes determining, by a battery monitoring circuit, an output current of the battery, and receiving, at the processor of the electronic device, an indication of the output current of the battery. The method also includes determining, by the processor, a power characteristic of the accessory circuit based on the indication of the output current of the battery, and controlling a power, by the processor, provided to the accessory circuit based on the power characteristic of the accessory circuit.

In the description that follows, certain examples are explained with reference to an "internal accessory circuit" and an "external accessory circuit." These circuits are examples of hardware components that perform hardware functions. Broadly, the power consumption of these hardware components while performing certain functions (i.e., "hardware functions") is monitored. In addition, it should be noted that the unmodified term "accessory circuit" is not limited to an internal or external circuit or location. Instead, the term "accessory" connotes a function, circuit, or component that provides additional or supplementary functions beyond those performed by other components, for example, a processor.

FIG. 1 is a block diagram of a portable electronic device 10. The portable electronic device 10 can be, for example, a smart telephone, a tablet computer, a two-way radio, a personal digital assistant (PDA), or other electronic device. As shown in FIG. 1, the portable electronic device 10 includes a battery monitoring circuit 14, a battery 18, a processor 22, a memory 23, and an internal accessory circuit 26. The battery 18 is a power source that provides an output voltage to the components of the portable electronic device 10 including the processor 22, the internal accessory circuit 26, and the battery monitoring circuit 14. The output current of the battery 18 is, of course, dependent on the existence of a potential difference and the impedance of the load connected to it.

The battery monitoring circuit 14 is electrically coupled to the battery 18 and the processor 22. The battery monitoring circuit 14 detects total output parameters (e.g., total output current and/or total output voltage) of the battery 18 and sends corresponding information (e.g., indications of the total output parameters) to the processor 22. The processor 22 uses the information from the battery monitoring circuit 14 to manage power within the portable electronic device 10. The battery monitoring circuit 14 includes hardware components for detecting the total output parameters (e.g., total output current and/or total output voltage) from the battery 18. For example, the battery monitoring circuit 14 includes current sensors, voltage sensors, and other components to detect various parameters indicative of a power output from the battery 18. The battery monitoring circuit 14 then sends the detected parameters to the processor 22.

In the embodiment illustrated, the internal accessory circuit 26 represents one or more hardware components within the portable electronic device 10 that are configured to perform a particular hardware function for the portable electronic device 10. The internal accessory circuit 26, as shown in FIG. 1, is not external to the portable electronic device 10, but rather performs a specific function within the portable electronic device 10. For example, the internal accessory circuit 26 may be a driving circuit for an internal speaker, a display, a vibrator, a global position system (GPS) circuit, or a wireless communication circuit (e.g., including an antenna and a transceiver). The internal accessory circuit 26 communicates with the processor 22. The processor 22 determines when the internal accessory circuit 26 is active or inactive. In the illustrated embodiment, the internal accessory circuit 26 is configured to receive an activation signal from the processor 22 to activate and begin providing the specific functionality to the portable electronic device 10. The activation signal may be received in response to, for example, a particular function being activated (e.g., automatically or by a user), or may be received in response to the portable electronic device 10 entering a condition that automatically activates the internal accessory circuit 26 (e.g., entering a low battery status may activate a speaker to sound an alarm). The activation signal may differ based on, for example, the type of internal accessory circuit 26 and/or conditions that activate the internal accessory circuit 26. In some embodiments, the portable electronic device 10 includes a plurality of internal accessory circuits 26, each providing a different and specific function for the portable electronic device 10.

As noted, the processor 22 receives information regarding the total output parameters of the battery 18 from the battery monitoring circuit 14. Using the information received from the battery monitoring circuit 14, the processor 22 controls operation of the internal accessory circuit 26. The exchange of information between the processor 22 and the internal accessory circuit 26 can vary based on the particular embodiment of internal accessory circuit 26 implemented. Regardless of the particular accessory or internal accessory circuit 26 utilized, the processor 22 receives information regarding the total output parameters of the battery 18 from the battery monitoring circuit 14, calculates a power characteristic of the internal accessory circuit 26, and controls power to the internal accessory circuit 26 based on the power characteristic of the internal accessory circuit 26.

The power characteristic may refer to, for example, a power consumption, an impedance, or another electrical quantity that provides an indication of the power requirements of the internal accessory circuits 26. To calculate the power characteristic of the internal accessory circuit 26, the processor 22 isolates the power used by the internal accessory circuit 26 by comparing the total output parameter information received from the battery monitoring circuit 14 during a first state of the portable electronic device 10 with the total output parameter information received from the battery monitoring circuit 14 during a second state of the portable electronic device 10. The first state and the second state of the portable electronic device 10 differ specifically in that the internal accessory circuit 26 is inactive during the first state of the portable electronic device 10, but is active during the second state of the portable electronic device 10. Therefore, by comparing the total output parameters of the battery 18 between the first state and the second state of the portable electronic device 10, the processor 22 can isolate the output parameters associated with the internal accessory circuit 26. For example, the processor 22 can determine the amount of output current and/or output voltage of the battery 18 that is directed to the internal accessory circuit 26 without the need for additional sensors. Since the processor 22 controls operation of the internal accessory circuit 26, the processor 22 determines when to enter the second state of the portable electronic device 10.

Figure 2:
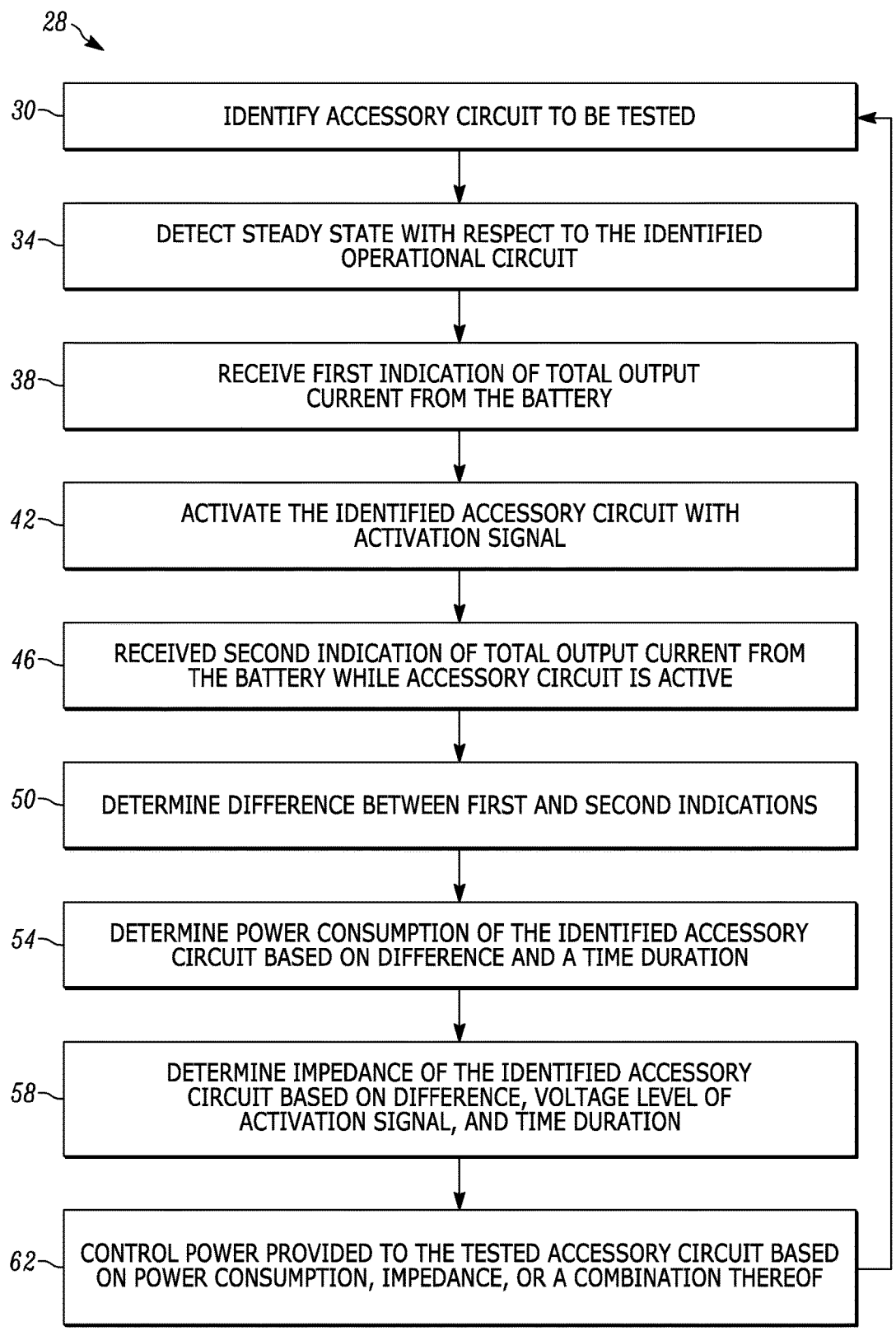
FIG. 2 is a flowchart of a method of managing power in the portable electronic device of FIG. 1 in accordance with some embodiments.

FIG. 2 illustrates a method or power control process 28 executed by the processor 22 of the portable electronic device 10 to control the amount of power provided to the internal accessory circuit 26. For example, the process shown in FIG. 2 may be implemented by the processor 22 as a result of executing software instructions stored in a non-transitory, computer readable medium, such as the memory 23. As noted, the portable electronic device 10 may include a plurality of internal accessory circuits 26. Therefore, in the first step, the processor 22 identifies an accessory circuit 26 to be tested (block 30). Once the accessory circuit 26 has been identified, the processor 22 detects a first state (e.g., a steady state) of the portable electronic device 10 (block 34) with respect to the identified accessory circuit. The steady state changes based on the particular accessory circuit 26 to be tested and the components necessary to drive the particular accessory circuit 26. The steady state refers to a state of the portable electronic device 10 in which the identified accessory circuit 26 and the components necessary to drive the identified accessory circuit 26 are inactive. During the steady state, the battery monitoring circuit 14 determines the total output current of the battery 18 and sends a first indication of the total output current of the battery 18 to the processor 22. This first indication of the total output current corresponds to the output current from the battery 18 specifically when the identified accessory circuit 26 is inactive. The processor 22 then receives the first indication of the total output current of the battery 18 (block 38).

The processor 22 proceeds to activate the identified accessory circuit 26 with an activation signal (block 42). The activation signal includes a test component having a predetermined voltage level (e.g., a predetermined magnitude) and a predetermined time duration. The nature of the activation signal may vary based on the particular accessory circuit 26 that receives the activation signal. The activation of the accessory circuit 26 initiates the second state of the portable electronic device 10. As discussed above, the second state of the portable electronic device 10 and the steady state of the portable electronic device 10 differ primarily in that the identified accessory circuit 26 is inactive during the steady state, and the identified accessory circuit 26 is active during the second state of the portable electronic device 10. Other components not associated with the identified accessory circuit 26 remain relatively static among the first state and the second state of the portable electronic device 10 (i.e., the state of other components of the portable electronic device 10 does not change between the steady state and the second state of the portable electronic device 10). When the state (e.g., activation or deactivation) of the other components of the portable electronic device 10 changes significantly between the steady state and the second state of the portable electronic device, the processor 22 may disregard information received from the battery monitoring circuit 14 and may wait to again detect the steady state (as performed in block 34). While the accessory circuit 26 is active (e.g., during the second state of the portable electronic device 10), the processor 22 receives a second indication from the battery monitoring circuit 14 regarding the total output current from the battery 18 (block 46). The second indication from the battery monitoring circuit 14 corresponds to a total output current of the battery 18 when the identified accessory circuit 26 is active as well as any other components of the portable electronic device 10 that were also active during the first state of the portable electronic device 10.

After receiving the second indication, the processor 22 determines the difference between the first indication and the second indication of the total output current from the battery 18 (block 50). The processor 22 determines the power consumption of the identified accessory circuit 26 based on the difference calculated in block 50 and a particular time duration for which the accessory circuit 26 was activated (block 54). The processor 22 additionally or alternatively determines an impedance of the identified accessory circuit 26 based on the difference calculated in block 50, the predetermined voltage level of the activation signal, and the time duration of the activation signal (block 58). The processor 22 then controls the power provided to the tested accessory circuit 26 based on the power consumption of the accessory circuit 26, impedance of the accessory circuit 26, and/or a combination thereof (block 62). While the processor 22 controls the power provided to the tested accessory circuit 26 and/or after the accessory circuit 26 stops operating, the processor 22 returns to block 30 to identify another accessory circuit 26 to be tested.

Although the battery monitoring circuit 14 has been described as providing an indication of the total output current from the battery 18, in some embodiments, the battery monitoring circuit 14 provides an indication of another measurement of the output of the battery 18. For example, the battery monitoring circuit 14 can determine and provide an indication of the total output power from the battery 18, the total output voltage from the battery 18, and/or other electrical quantities.

Additionally, although FIG. 2 illustrates the portable electronic device 10 as determining (e.g., calculating) a power consumption of the accessory circuit 26 and an impedance of the accessory circuit 26, in some embodiments, the portable electronic device 10 may only calculate the power consumption or the impedance of the accessory circuit 26, and not both.

Figure 3:
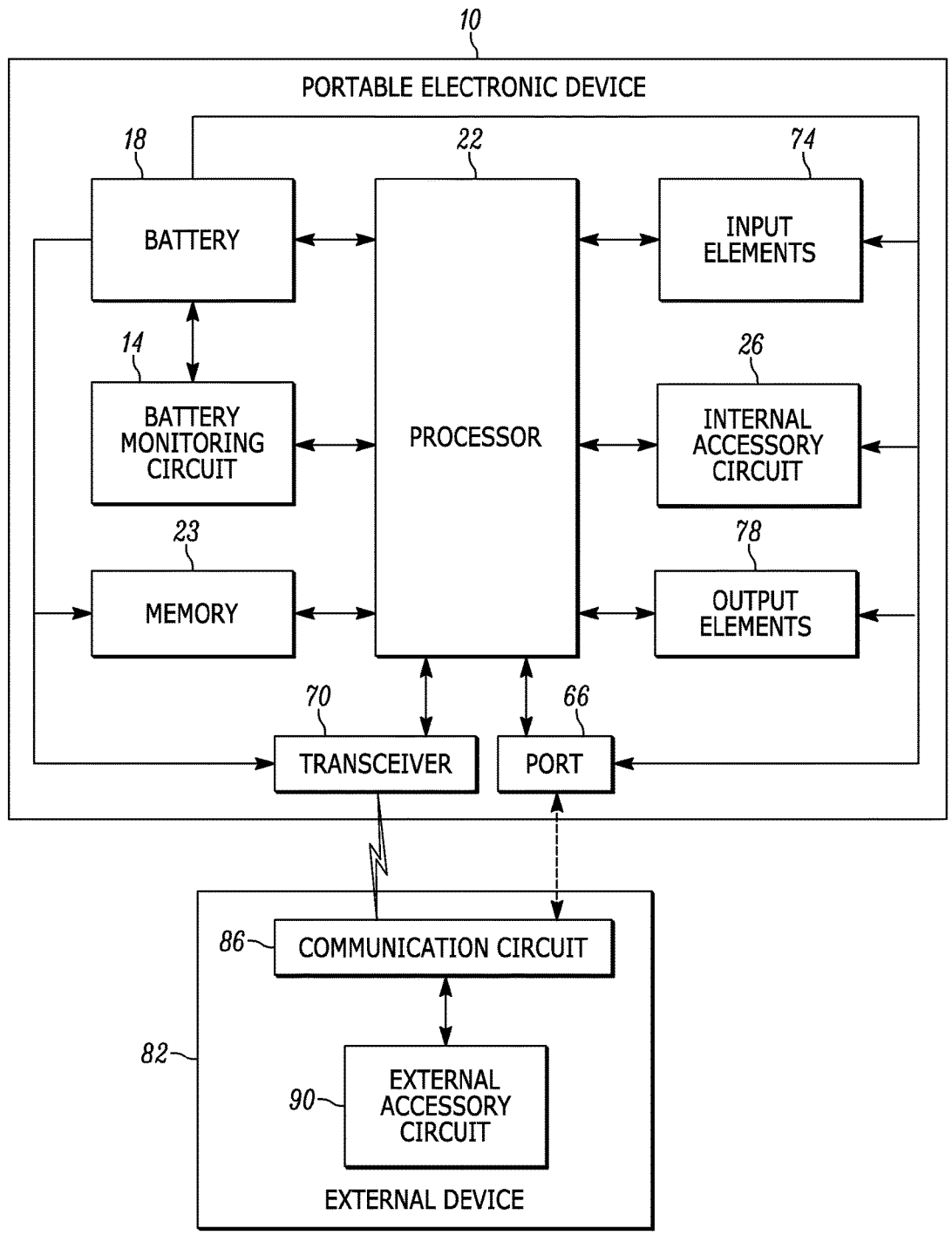
FIG. 3 is a more detailed block diagram of the portable electronic device of FIG. 1.

FIG. 3 illustrates the portable electronic device 10 in greater detail than FIG. 1. In the embodiment shown, the portable electronic device includes a port 66, a transceiver 70, input devices 74, and output devices 78. As also shown in FIG. 3, the port 66 and the transceiver 70 provide a coupling mechanism between the portable electronic device 10 and the external device 82. The port 66 also receives power from the battery 18 and is electrically coupled to the processor 22. The port 66 includes physical structures to receive and engage an external connector (not shown). The external connector may be part of an external device 82 and/or the external connector may be part of a cable connecting the external device 82 with the portable electronic device 10. The port 66 exchanges data with the external device 82 through the external connector. In the illustrated embodiment, the port 66 is also configured to receive power from an external power source to, for example, charge the battery 18 (e.g., via a charging cable) and to output power from the battery 18 (e.g., to power the external device 82). In the illustrated embodiment, the port 66 is a universal serial bus (USB) port configured to power and/or communicate with the external device 82. In other embodiments, the port 66 may be a different type of port and may, therefore, have a different construction. For example, the port 66 may be a proprietary port configured to receive and engage only compatible connectors.

The transceiver 70 also receives power from the battery 18 and is electrically coupled to the processor 22. The transceiver 70 includes an antenna and circuitry to transmit and receive wireless communications with the external device 82. In the illustrated embodiment, the transceiver 70 is a short-range transceiver 70 configured to transmit and receive wireless communications within a relatively small range (e.g., 30 feet). In the illustrated embodiment, the transceiver 70 is a BLUETOOTH® transceiver. In other embodiments, the transceiver 70 may use a different communication protocol. For example, in other embodiments, the transceiver 70 may be a near-field communication (NFC) transceiver operable in short distances (e.g., a few inches), a ZIGBEE® transceiver, and/or a different type of transceiver. In some embodiments, the portable electronic device 10 includes more than one transceiver 70 to communicate with various types of external devices 82 and/or communicate using a variety of communication protocols.

In the illustrated embodiment, the external device 82 is coupled to both the port 66 and the transceiver 70. Such a connection is primarily for illustrative purposes to indicate that the external device 82 may be electrically coupled to the portable electronic device 10 via the port 66, the transceiver 70, or a combination of the two. In some embodiments, the external device 82 is electrically coupled to the portable electronic device 10 via only one of the port 66 and/or the transceiver 70. In yet other embodiments, the external device 82 may be electrically coupled to the portable electronic device 10 via both the wired port 66 and the wireless transceiver 70. In such embodiments, the external device 82 may exchange data with the portable electronic device 10 using the wireless transceiver 70, but may receive power through the port 66.

As shown in FIG. 3, the external device 82 includes a communication circuit 86 and an external accessory circuit 90. The external device 82 provides additional and/or enhanced functionality to the portable electronic device 10. The communication circuit 86 communicates with the portable electronic device 10 through the port 66, the transceiver 70, or a combination thereof. In the illustrated embodiment, the communication circuit 86 can exchange data with the portable electronic device 10 as well as receive power from the portable electronic device 10.

The external accessory circuit 90 receives communications from the communication circuit 86 and operates the external device 82 accordingly. In particular, the external accessory circuit 90 includes hardware and software to enable the external device 82 to provide desired functionality for the portable electronic device 10. The external device 82 may also include additional components not shown or described herein depending on, for example, the particular functionality and/or purpose of the external device 82.

In one embodiment, the processor 22 controls the operation of the external device 82 in a manner that is similar to the manner in which the processor controls the internal accessory circuit 26. In one example, the processor 22 determines when the external device 82 operates by sending power and/or an activation signal to the external accessory circuit 90. In some embodiments, when the processor 22 ceases to transmit the activation signal, the external device 82 also ceases operation. The exchange of information between the processor 22 and the external accessory circuit 90 can vary based on the type of external accessory circuit 90 implemented. Additionally, the processor 22 can implement a similar process to the power control process described with respect to FIG. 2. In one example, the processor 22 receives information regarding the total output parameters of the battery 18 from the battery monitoring circuit 14, calculates a power characteristic of the external accessory circuit 90, and controls power to the external accessory circuit 90 based on the power characteristic of the external accessory circuit 90. The processor 22 determines the power characteristic of the external accessory circuit 90 in a similar manner to that illustrated in FIG. 2.

The processor 22 can also use a process similar to the power control process 28 discussed above and illustrated in FIG. 2 to determine a type of external device 82 coupled to the portable electronic device 10. As noted, the processor 22 of the portable electronic device 10 can determine specific power characteristics of the external accessory circuit 90. In one embodiment, the processor 22 determines, based on the power characteristic(s), other characteristics of the external device 82. This determination will be described using an external speaker as a specific example of the external device 82. In this example, an external accessory circuit 90 includes an external speaker circuit. The external speaker circuit allows and controls operation of the external speaker. A variety of types of external speakers including a type that is referred to as an "enhanced speaker" may be electrically coupled to the portable electronic device 10. The type of external speaker may also vary depending upon the manufacturer of the speaker. In some cases, incompatibilities may arise if the manufacturer of the external speaker is not the same as the manufacturer of the portable electronic device 10.

As will be described in greater detail, the processor 22 implements a method or process to identify whether the external speaker 82 connected to the portable electronic device 10 is an enhanced speaker and whether the external speaker is associated with the same manufacturer as the portable electronic device 10.

For purposes of the example provided, an enhanced speaker has a lower impedance (e.g., four Ohms) than a non-enhanced speaker (which may have impedance, e.g., of sixteen Ohms). These impedance values are provided merely as examples to facilitate understanding of embodiments of the invention and should not be viewed as limiting. Due to its lower impedance, the enhanced speaker increases a crest factor and a perceived loudness of the external speaker. Having a higher crest factors allows for a wider range of signals to be faithfully reproduced through the external speaker. Therefore, an enhanced speaker improves the sound experience by increasing the crest factor and the perceived loudness of the external speaker. However, due to its lower impedance, an enhanced speaker requires more power and in many cases, drains the battery 18 faster. Therefore, the portable electronic device 10 decides how to best allocate the power resources based on the determined power characteristics of the external speaker 82. In other words, the portable electronic device 10 (an more particularly, the processor 22) determines, based on the power characteristics and the manufacturer associated with the external speaker 82, whether to provide power necessary for the external speaker 82 to operate as an enhanced speaker or to reduce the power to the external speaker 82 to inhibit its operation as an enhanced speaker. For example, an external speaker 82 is connected to the portable electronic device 10 and the external speaker 82 is associated with a manufacturer that is different than the manufacturer of the portable electronic device 10, the processor 22 may limit resources (e.g., voltage, current, bandwidth) made available to the external speaker 82 to avoid faster battery drain or other potential adverse consequence that may occur as a result in using an external speaker not specifically designed for use with the portable electronic device 10.

Figure 4:
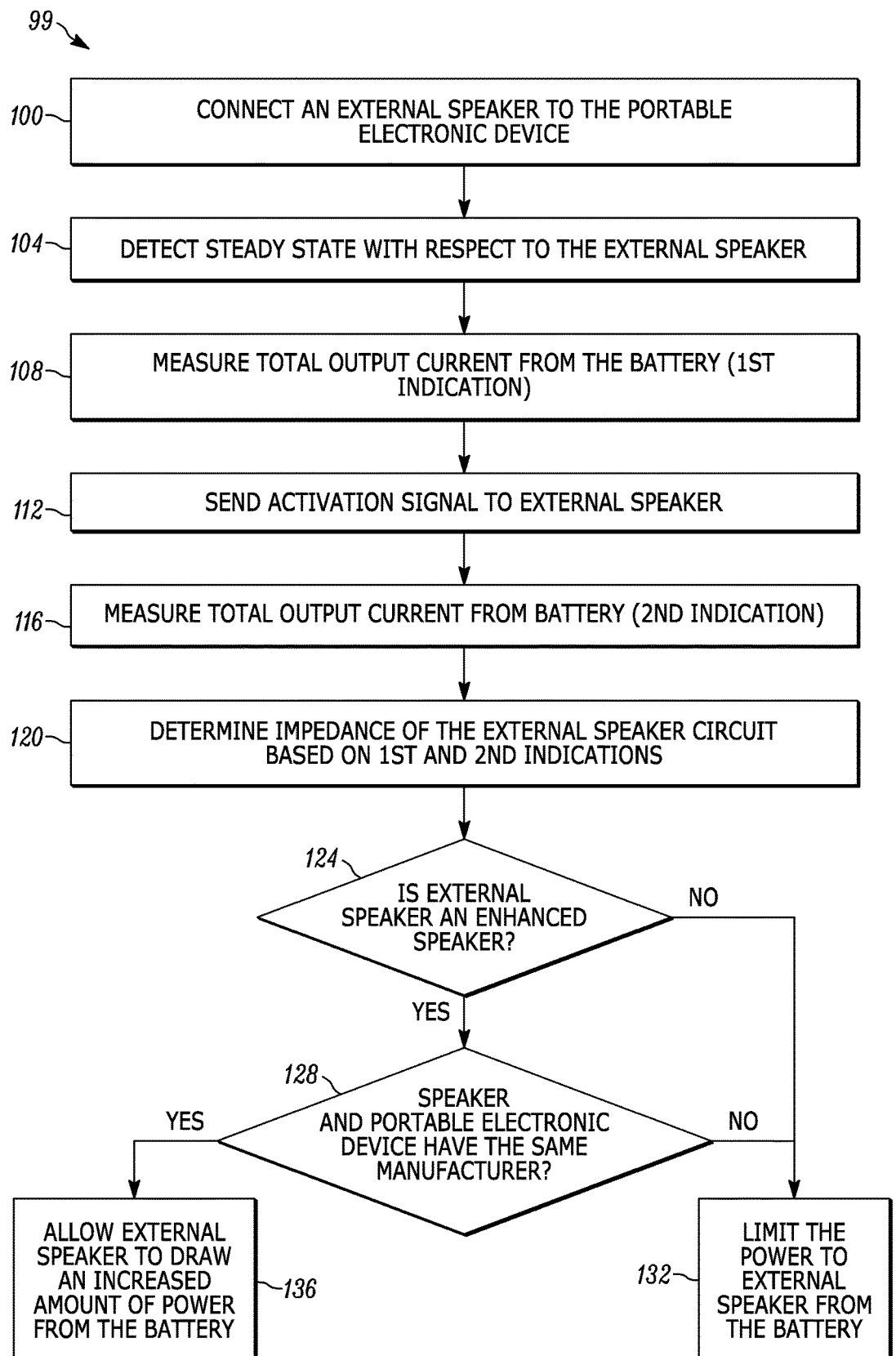
FIG. 4 is a flowchart of a method of managing power to an external speaker in the portable electronic device of FIG. 1 in accordance with some embodiments.

FIG. 4 illustrates an example of a method or speaker control process 99 in which the processor 22 determines whether the electrically coupled external speaker 82 is an enhanced speaker and whether the external speaker 82 is manufactured by same manufacturer (or, for example, made under license from the same manufacturer) of the portable electronic device 10. As shown in FIG. 4, first the external speaker 82 is electrically coupled to the portable electronic device 10 (block 100), for example, via the port 66. The processor 22 then detects a steady state with respect to the external accessory circuit 90 (block 104). In other words, the processor 22 detects a state in which the components used to drive the circuit for the external speaker 82 are not used. The battery monitoring circuit 14 then detects the total output current of the battery 18 and provides the first indication corresponding to the total output current of the battery 18 to the processor 22 (block 108).

The processor 22 then sends an activation signal to the external accessory circuit 90 (block 112). In the illustrated embodiment, the activation signal includes an infrasonic test component that is sent to the external speaker 82. As its name implies, the bandwidth of the infrasonic test component is set within frequencies that are not readily perceived by human ears. The infrasonic test component has a predetermined magnitude and time duration. While the external accessory circuit 90 remains active (i.e., during the second state of the portable electronic device 10), the battery monitoring circuit 14 detects the total output current from the battery 18 and provides the second indication to the processor 22 (block 116). As previously discussed, the second indication corresponds to the total output current from the battery 18 while the portable electronic device 10 is in the second state. Having received the first indication and the second indication, the processor 22 determines the impedance of the external speaker 82 based on the first indication and the second indication (block 120). In the illustrated embodiment, the processor 22 determines the impedance of the external speaker 82 using the first indication, the second indication, time duration of the activation signal, and voltage level (e.g., magnitude) of the activation signal.

The processor 22 then determines whether the external speaker 82 is an enhanced speaker based on the impedance of the external speaker 82 (block 124). In one particular embodiment, the processor 22 determines whether the calculated impedance for the external speaker 82 is below a predetermined threshold (e.g., 10 Ohms). When the impedance calculated for the external speaker 82 is below the predetermined threshold, the processor 22 determines that the external speaker 82 electrically coupled to the portable electronic device 10 is an enhanced speaker. The processor 22 then proceeds to block 128. When, on the other hand, the impedance calculated for the external speaker is greater than or equal to the predetermined threshold, the processor 22 determines that the external speaker 82 electrically coupled to the portable electronic device 10 is a non-enhanced speaker. The processor 22 then limits the power available to the portable electronic device 10 since a limited quantity of power is enough to drive the non-enhanced speaker (block 132).

Next, the processor 22 determines whether the external speaker 82 and the portable electronic device 10 have the same manufacturer (block 128). The processor 22 retrieves information from the external speaker 82 through, for example, the port 66. Part of the information retrieved by the processor 22 includes a manufacturer code or similar identifier of the external speaker 82. The processor 22 then compares the manufacturers associated with each of the external speaker 82 and the portable electronic device 10. When the processor 22 determines that the external speaker 82 and the portable electronic device 10 do not share the same manufacturer, the processor 22 limits, for example, the power provided to the external speaker 82 from the battery 18 (block 132). In some embodiments, limiting the power provided to the external speaker 82 includes reducing the power provided to the external speaker 82 when 1) the power characteristic (e.g., the power consumption) of the external speaker 82 is above a predetermined threshold, or 2) when the power characteristic (e.g., the impedance) of the external speaker 82 is below another predetermined threshold. When the processor 22 limits the power provided to the external speaker 82 (or a different accessory circuit 26, 90), the processor 22 limits the power provided to the external speaker 82 to a first power level that is less than the power consumption determined for the external speaker 82. On the other hand, when the processor 22 determines that the external speaker 82 is from the same manufacturer as the portable electronic device 10, the portable electronic device 10 allows the external speaker 82 to draw an increased amount of power from the battery 18 (block 136), thereby allowing for an enhanced sound experience due to the enhanced speaker features. The portable electronic device 10 continues to provide power to the external speaker 82 until the external speaker 82 is disconnected from the portable electronic device 10 and/or the external speaker 82 is powered down.

Referring back to FIG. 3, the portable electronic device 10 also includes components that are common of a portable electronic device 10 such as the input devices 74 and the output devices 78. In some embodiments, the input devices 74 provide sensors, buttons, and/or actuators that relay input signals to the processor 22. The input devices 74 may include physical buttons and switches, touch sensors, movement sensors, microphone, voice recognition software, virtual buttons and switches, and/or a combination of the above. The input devices 74 communicate inputs to the processor 22 such that the processor 22 can activate and/or initiate a particular function and/or action. For example, the input devices 74 may turn on/off the portable electronic device 10, import and export data, launch an application, and the like. The output devices 78 allow the portable electronic device 10 to generate notifications and/or display information. The output devices 78 may include, for example, a display, a speaker, and/or a vibrator. The portable electronic device 10 uses the output devices 78 to, for example, communicate certain conditions of the portable electronic device 10 (e.g., low battery), and about any applications running on the portable electronic device 10 (e.g., a notification for a received telephone call).

Additionally, the battery 18 included in the portable electronic device 10 may be a replaceable (e.g., disposable) battery or a rechargeable battery. In embodiments in which the battery 18 is a rechargeable battery, the portable electronic device 10 may also include a charging circuit to control the charging of the battery 18 such that the battery 18 may be charged while located within the portable electronic device 10. When charged while inside the portable electronic device 10, the battery 18 may receive power through the port 66. The battery 18 may additionally or alternatively receive power wirelessly. In certain embodiments, the rechargeable battery 18 may be charged outside of the portable electronic device 10. In addition to supplying components within the portable electronic device 10, the battery 18 may also provide power to devices (e.g., accessories) that are external to the portable electronic device 10, including, for example, the external device 82.

Other alternatives and modified versions of the methods and processes described with reference to FIGS. 2 and 4 can be used with portable electronic devices 10. The portable electronic device 10 may monitor and isolate the power consumption of the internal accessory circuit 26 or the external accessory circuit 90. In some embodiments, the methods and processes described with respect to FIGS. 2 and 4 can be used in diagnostics tests to ensure that the internal accessory circuit 26 and external accessory circuit 90 of the portable electronic device 10 work properly by monitoring their individual power consumption.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable electronic device comprising: a battery coupled to an accessory circuit; a battery monitoring circuit coupled to the battery and configured to determine an output current of the battery; a processor coupled to the battery monitoring circuit and the accessory circuit, the processor configured to: receive a first indication of the output current of the battery, receive a second indication of the output current of the battery, determine, based on the first and second indications of the output current of the battery, a power characteristic of the accessory circuit, and control a power provided to the accessory circuit based on the power characteristic of the accessory circuit; and wherein the power characteristic includes a power consumption of the accessory circuit, and wherein the processor is configured to control the power accessory circuit to a first power level when the power consumption of the accessory circuit is above a redetermined threshold, and wherein the first power level is less than the power consumption of the accessory circuit.

2. The portable electronic device of claim 1, wherein an indication of the output current of the battery corresponds to an output current of the battery during a first state of the portable electronic device, and wherein the processor is configured to detect the first state of the portable electronic device, the first state being indicative of the accessory circuit being inactive.

3. The portable electronic device of claim 1, the processor configured to determine, based on the first indication and the second indication, an impedance of the accessory circuit, and wherein the processor is configured to control the power provided to the accessory circuit based on the impedance of the accessory circuit.

4. The portable electronic device of claim 1, the processor configured to determine, based on the first indication and the second indication, a power consumption of the accessory circuit, and wherein the processor is configured to control the power provided to the accessory circuit.

5. The portable electronic device of claim 1, wherein the processor is configured to determine whether the accessory circuit and the portable electronic device are associated with a same manufacturer, and wherein the processor provides less power to the accessory circuit when the accessory circuit and the portable electronic device are associated with different manufacturers.

6. A portable electronic device comprising:
a battery coupled to an accessory circuit;
a battery monitoring circuit coupled to the battery and configured to determine an output current of the battery;
a processor coupled to the battery monitoring circuit and the accessory circuit, the processor configured to:
receive a first indication of the output current of the battery,
determine, based on the first indication of the output current of the battery, a power characteristic of the accessory circuit, and
control a power provided to the accessory circuit based on the power characteristic of the accessory circuit;
wherein the first indication of the output current of the battery corresponds to the output current of the battery during a first state of the portable electronic device, and wherein the processor is configured to detect the first state of the portable electronic device, the first state being indicative of the accessory circuit being inactive;
wherein the processor is configured to send an activation signal to the accessory circuit, and receive a second indication of the output current of the battery corresponding to the output current of the battery during a second state of the portable electronic device, wherein the accessory circuit is active during the second state of the portable electronic device.

7. The portable electronic device of claim 6, wherein the activation signal includes a test component having a predetermined voltage level and a predetermined time duration.

8. The portable electronic device of claim 6, wherein the accessory circuit includes an external accessory circuit.

9. The portable electronic device of claim 8, wherein the external accessory circuit is an external speaker circuit, and wherein the activation signal includes an infrasonic test component having a predetermined magnitude and a predetermined time duration.

10. A method of managing power in an electronic device including a battery coupled to an accessory circuit and a processor, the method comprising: determining, by a battery monitoring circuit, an output current of the battery; receiving, at the processor of the electronic device, a first indication of the output current from the battery; receiving, at the processor of the electronic device, a second indication of the output current from the battery; determining; by the processor, a power characteristic of the accessory circuit based on the first and second indications of the output current of the battery; controlling a power, by the processor, provided to the accessory circuit based on the power characteristic of the accessory circuit; and wherein determining the power characteristic of the accessory circuit includes determining, by the processor, a power consumption of the accessory circuit; and wherein controlling the power provided to the accessory circuit includes limiting the power provided to the accessory circuit to a first power level, wherein the first power level is less than the power consumption determined by the processor.

11. The method of claim 10, further comprising
detecting, by the processor, a first state of the portable electronic device, the first state being indicative of the accessory circuit being inactive, and
wherein receiving the indication of the output current from the battery includes receiving the indication of the output current of the battery while the electronic device is in the first state.

12. The method of claim 10, further comprising:
determining, by the processor, an impedance of the accessory circuit based on the first indication and the second indication, and
wherein controlling the power provided to the accessory circuit includes controlling the power provided to the accessory circuit based on the impedance of the accessory circuit.

13. The method of claim 10, further comprising:
determining, by the processor, a power consumption of the accessory circuit based on the first indication and the second indication, and
wherein controlling the power provided to the accessory circuit includes controlling the power provided to the accessory circuit based on the power consumption of the accessory circuit.

14. The method of claim 10, further comprising:
determining whether the accessory circuit and the portable electronic device are associated with a same manufacturer, and
wherein controlling power to the accessory circuit includes providing less power to the accessory circuit when the accessory circuit and the portable electronic device are associated with different manufacturers.

15. A method of managing power in an electronic device including a battery coupled to an accessory circuit and a processor, the method comprising:
detecting, by the processor, a first state of the portable electronic device, the first state being indicative of the accessory circuit being inactive;
determining, by a battery monitoring circuit, an output current of the battery;
receiving, at the processor of the electronic device, a first indication of the output current from the battery while the electronic device is in the first state;
determining, by the processor, a power characteristic of the accessory circuit based on the first indication of the output current from the battery;
controlling, by the processor, a power provided to the accessory circuit based on the power characteristic of the accessory circuit;
sending, by the processor, an activation signal to the accessory circuit; and
receiving, at the processor, a second indication of the output current from the battery while the portable electronic device is in a second state, wherein the accessory circuit is active during the second state of the portable electronic device.

16. The method of claim 15, wherein sending the activation signal to the accessory circuit includes sending a test component having a predetermined voltage level and a predetermined time duration.

17. The method of claim 15, wherein sending the activation signal to the accessory circuit includes sending the activation signal to an external speaker circuit.

18. The method of claim 17, wherein sending the activation signal includes sending an infrasonic test component to the external speaker circuit.

* * * * *